Figure 1:
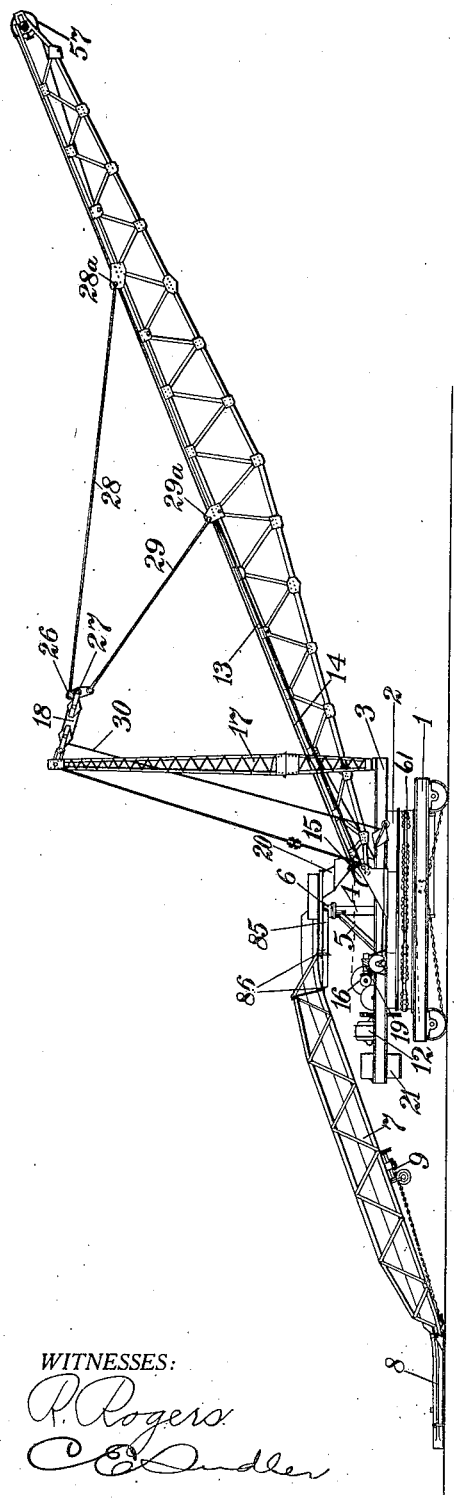

No. 897,893. PATENTED SEPT. 8, 1908.
W. E. HAMILTON.
LOADING AND STORING MACHINE.
APPLICATION FILED AUG. 29, 1907.

11 SHEETS—SHEET 1.

WITNESSES:
P. Rogers
C. E. Dudley

William E. Hamilton, INVENTOR.

BY
Geo. W. Rightmire
ATTORNEY.

No. 897,893. PATENTED SEPT. 8, 1908.
W. E. HAMILTON.
LOADING AND STORING MACHINE.
APPLICATION FILED AUG. 29, 1907.

11 SHEETS—SHEET 3.

WITNESSES:
P. Rogers

William E. Hamilton,
INVENTOR.

BY
Geo. W. Rightmire
ATTORNEY.

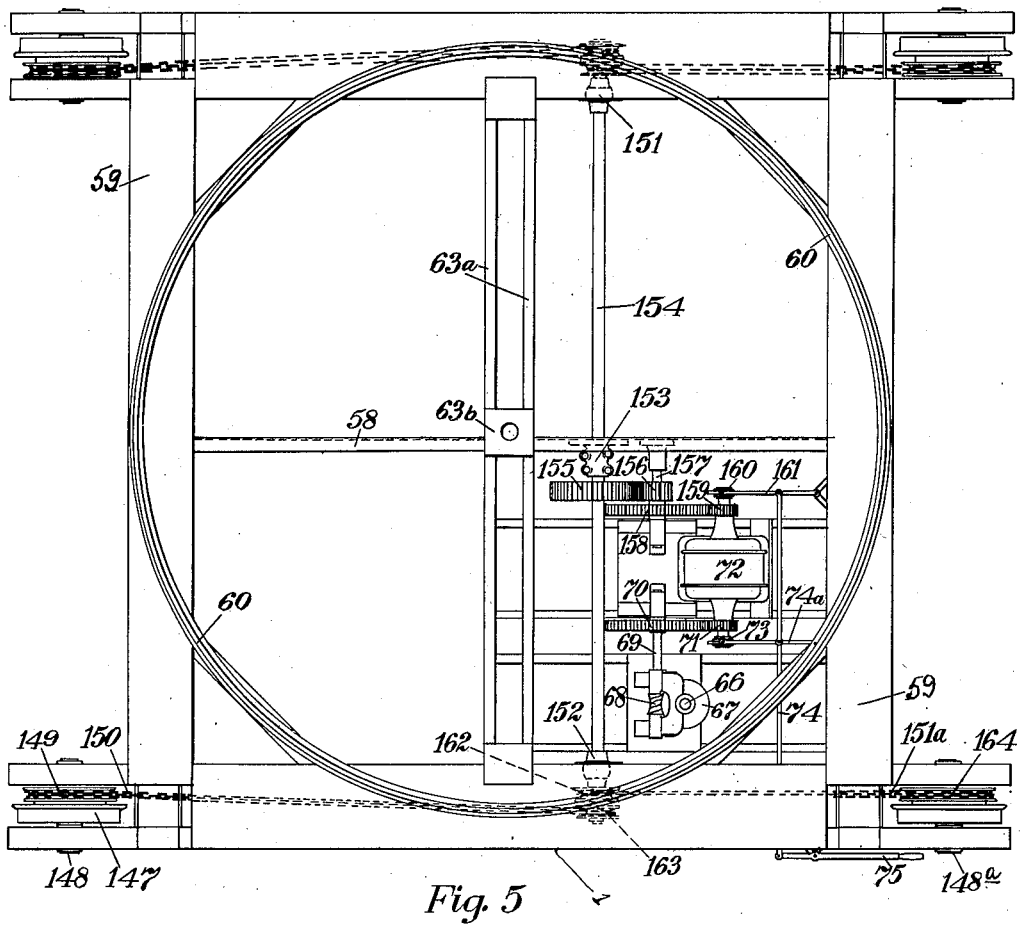

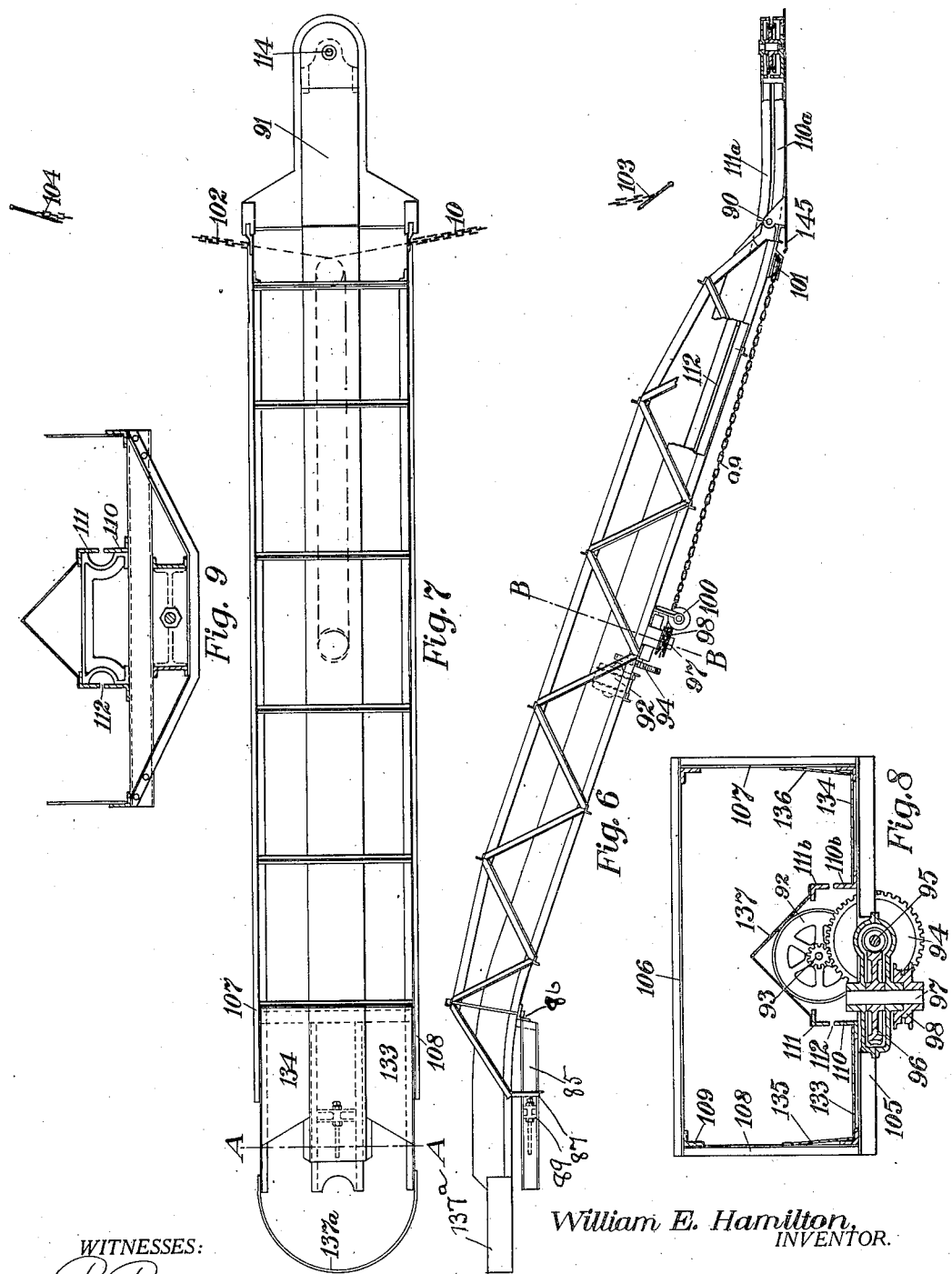

No. 897,893. PATENTED SEPT. 8, 1908.
W. E. HAMILTON.
LOADING AND STORING MACHINE.
APPLICATION FILED AUG. 29, 1907.

11 SHEETS—SHEET 6.

WITNESSES:

William E. Hamilton, INVENTOR.

BY

ATTORNEY.

No. 897,893. PATENTED SEPT. 8, 1908.
W. E. HAMILTON.
LOADING AND STORING MACHINE.
APPLICATION FILED AUG. 29, 1907.
11 SHEETS—SHEET 7.
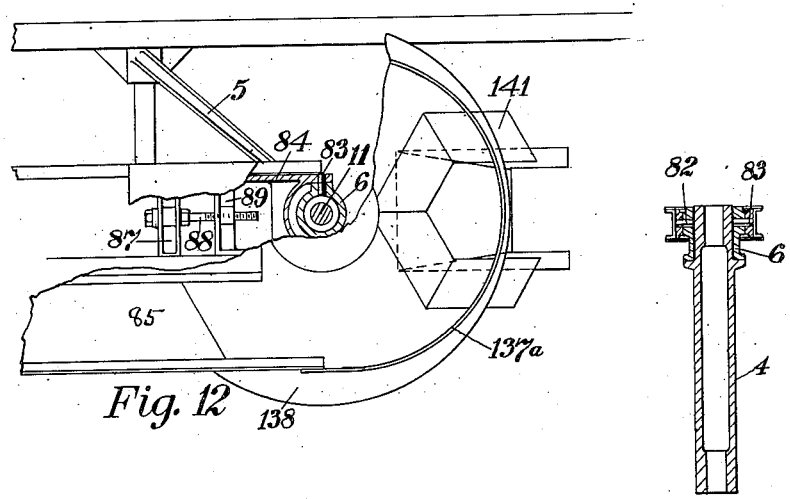
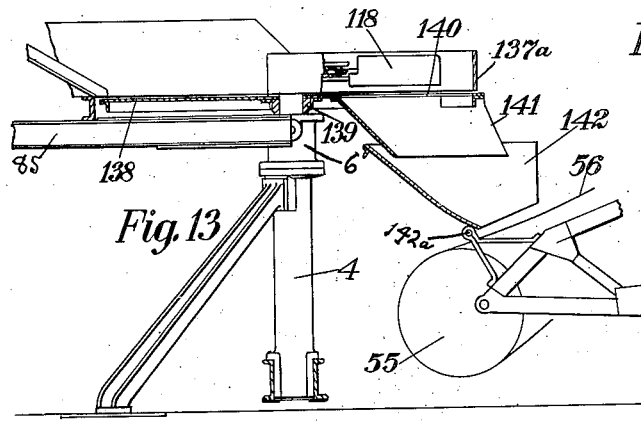
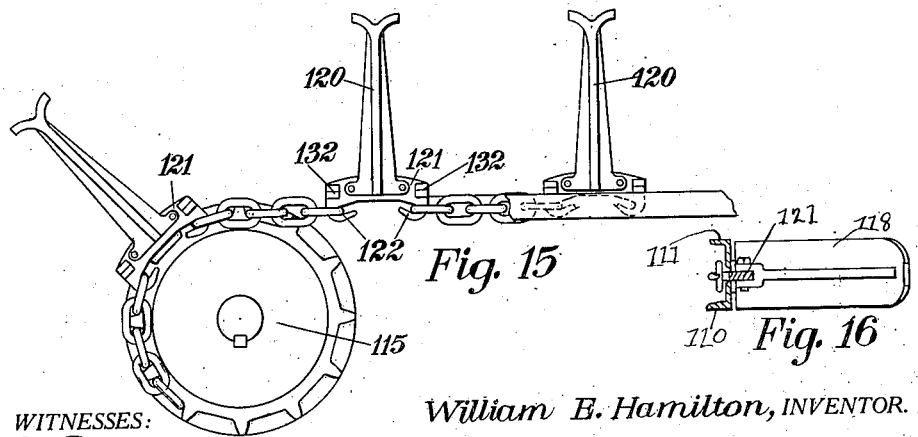
WITNESSES:
William E. Hamilton, INVENTOR.
BY
ATTORNEY.

No. 897,893. PATENTED SEPT. 8, 1908.
W. E. HAMILTON.
LOADING AND STORING MACHINE.
APPLICATION FILED AUG. 29, 1907.
11 SHEETS—SHEET 9.
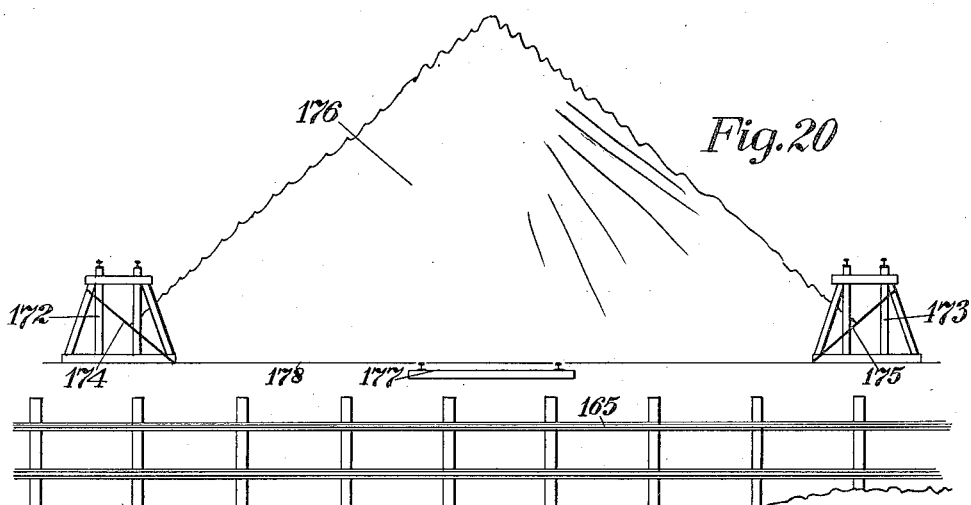
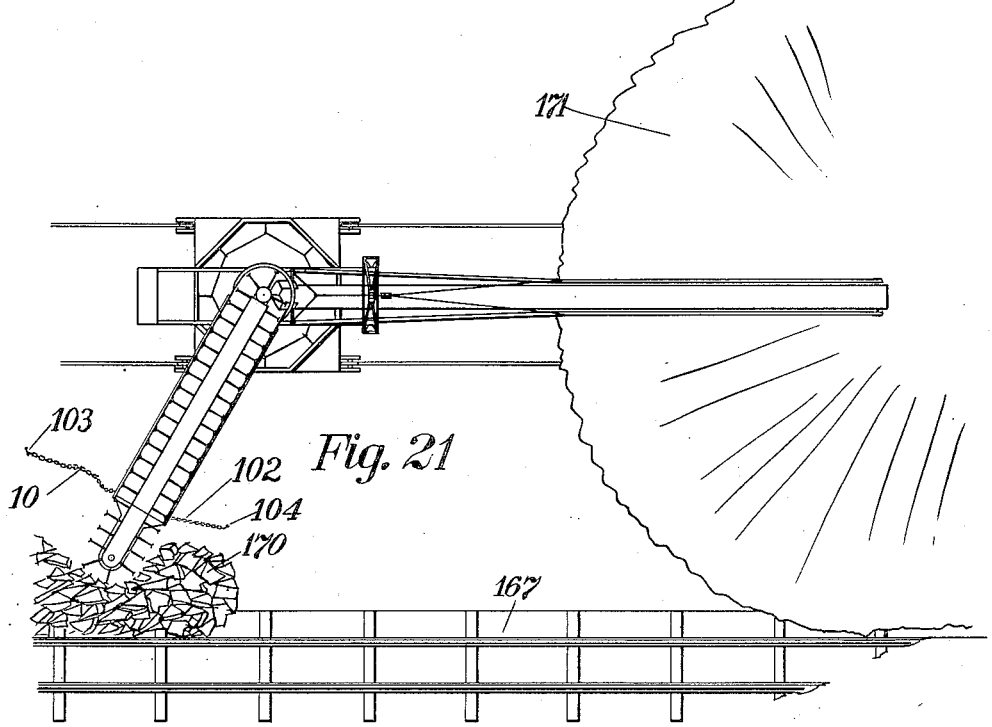
William E. Hamilton, Inventor

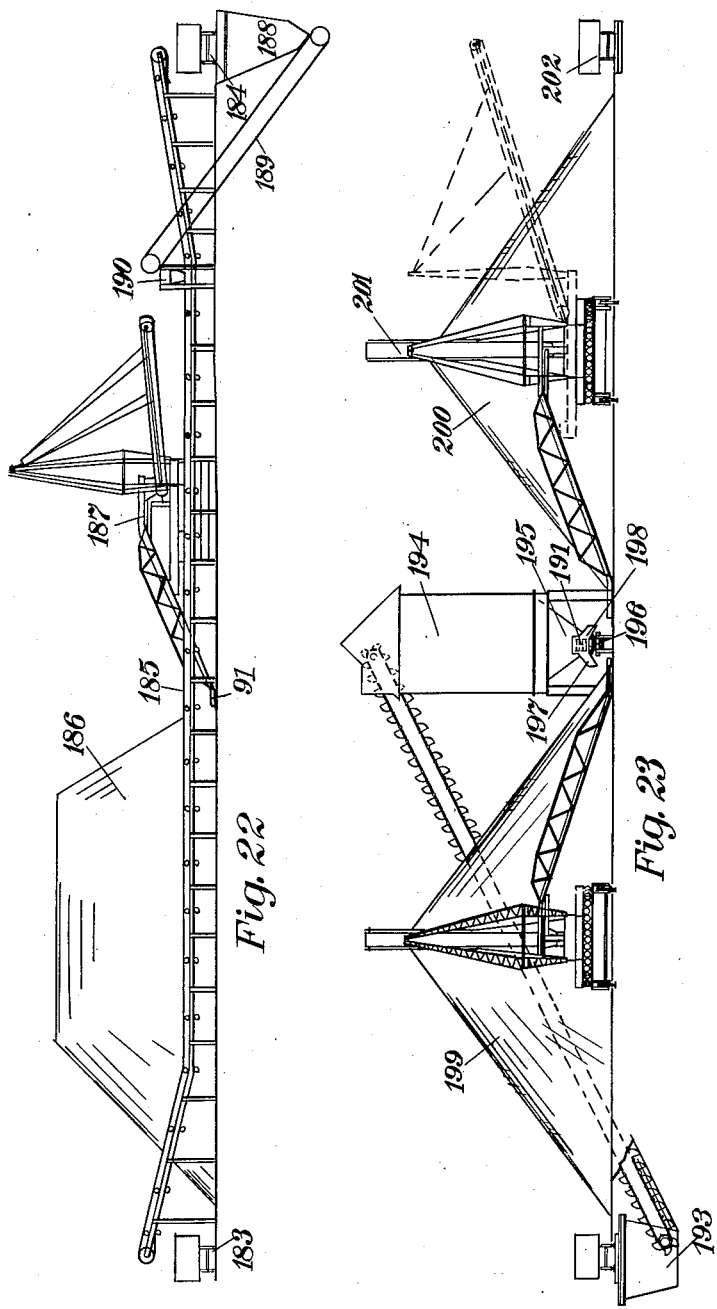

No. 897,893. PATENTED SEPT. 8, 1908.
W. E. HAMILTON.
LOADING AND STORING MACHINE.
APPLICATION FILED AUG. 29, 1907.
11 SHEETS—SHEET 11.

WITNESSES:

William E. Hamilton, INVENTOR.

BY

ATTORNEY.

UNITED STATES PATENT OFFICE.

WILLIAM E. HAMILTON, OF COLUMBUS, OHIO.

LOADING AND STORING MACHINE.

No. 897,893.

Specification of Letters Patent.

Patented Sept. 8, 1908.

Application filed August 29, 1907. Serial No. 390,829.

*To all whom it may concern:*

Be it known that I, WILLIAM E. HAMILTON, a citizen of the United States, residing at Columbus, in the county of Franklin and State of Ohio, have invented certain new and useful Improvements in Loading and Storing Machines, of which the following is a specification.

My invention relates to improvements in loading and storing machines used especially in the handling of coal and other loose material, by the use of which the loose material may be conveniently and compactly stored in bins or a storage yard, and also reclaimed or taken from storage and placed in cars or other receptacles for removal.

It consists especially in the provision of a machine mounted upon a turn table upon a truck, the turn table supporting a delivery conveyer, and one end of a gathering conveyer in such manner that the delivery conveyer may be arranged at any angle desired with respect to the gathering conveyer.

It further consists in the provision of a delivery conveyer pivotally mounted at one end thereof to be adjusted vertically, and preferably suspended from a frame by supporting rods or cables secured thereto at separated points in such manner that the stress on the several supporting cables is approximately balanced.

It further consists in the mounting of the gathering conveyer at one end rotatably upon a support mounted on the turntable but said conveyer is not rotatable with the turntable.

It also comprises the provision of a nose portion hinged to said gathering conveyer at its outer end to admit of vertical movement thereon, and adapted to rest upon the ground or platform upon which the material lies, and which is so constructed that the gathering may take place from either side thereof, mechanism being provided for urging the hinged portion into the material in either direction.

It also comprises the provision upon the gathering conveyer of mechanism for swinging said conveyer in either lateral direction; it also comprises the provision of a slideway at each side of said gathering conveyer, and flights so constructed that they may deliver material in either direction.

It also comprises the provision of means between said gathering and delivery conveyers whereby the material brought up by the gathering conveyer will be delivered to the delivery conveyer irrespective of the relative positions of the two conveyers.

It further comprises the provision of means for operating said conveyers, means for positioning the conveyers as desired, means for operating the turn table, and means for actuating the truck upon which the entire operating devices are mounted.

It consists also in the provision of other parts and devices and their combinations which will hereinafter be clearly set forth.

Figure 2:
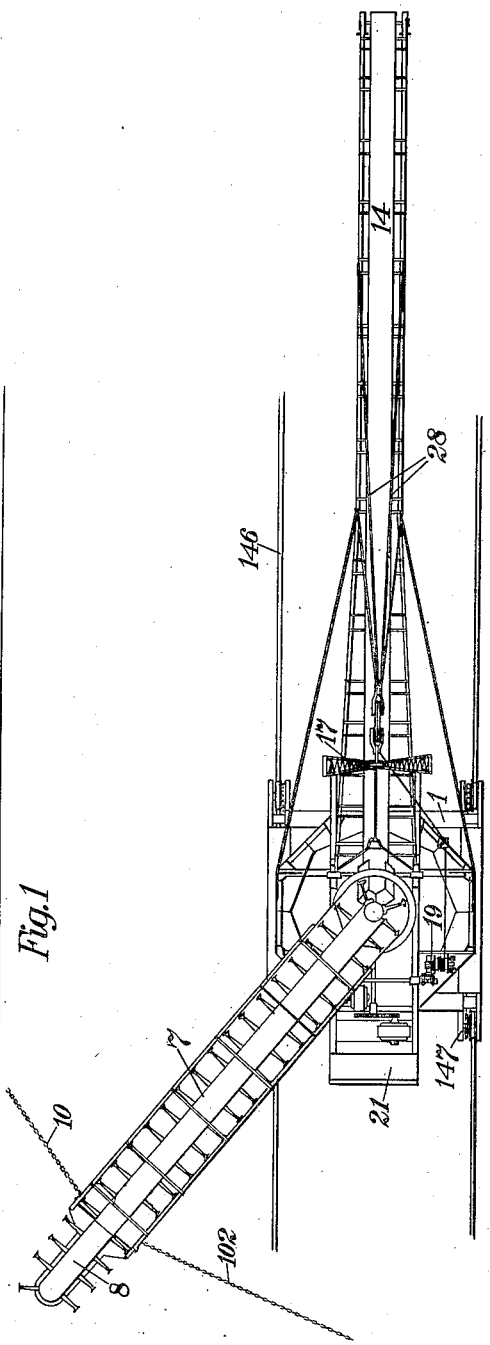
Figure 3:
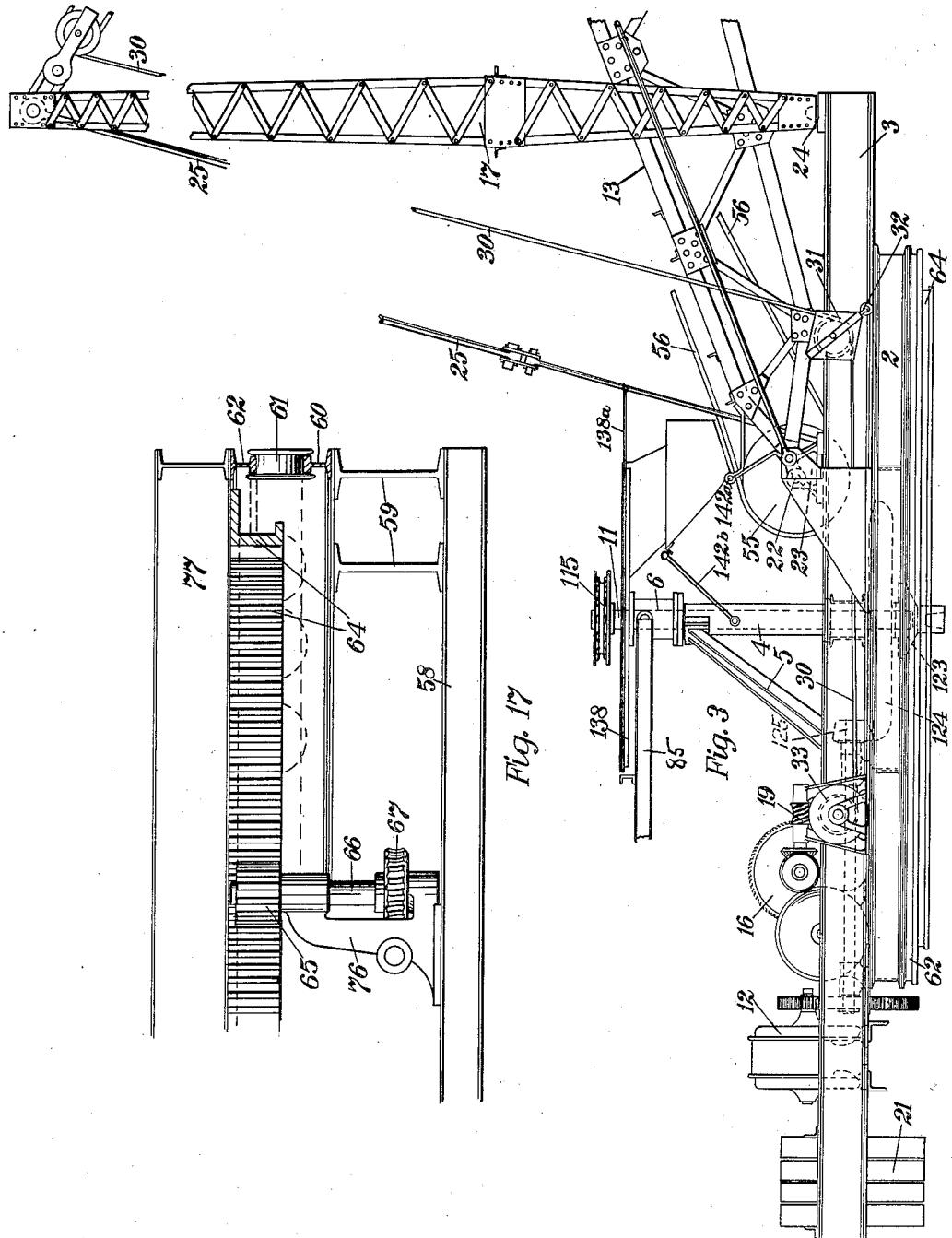
Figure 4:
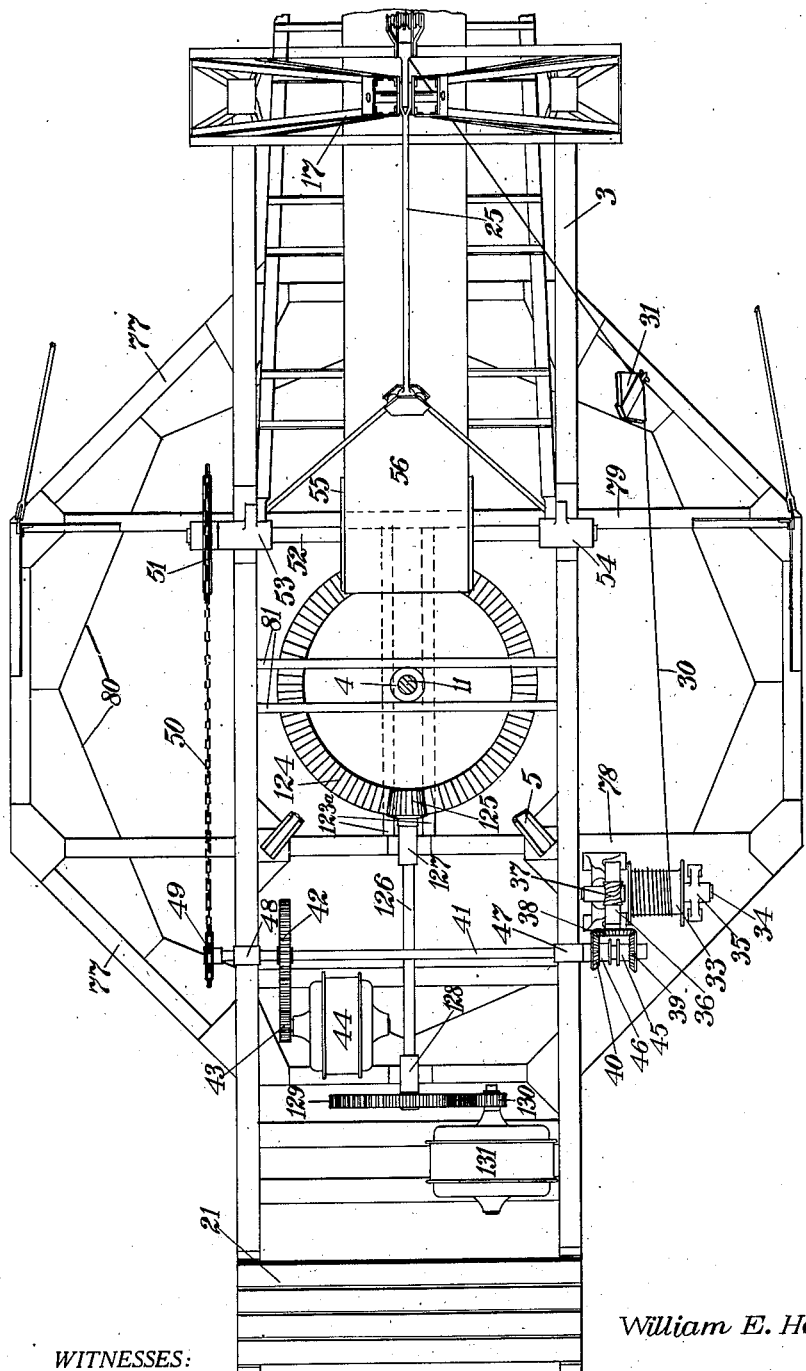
Figure 10:
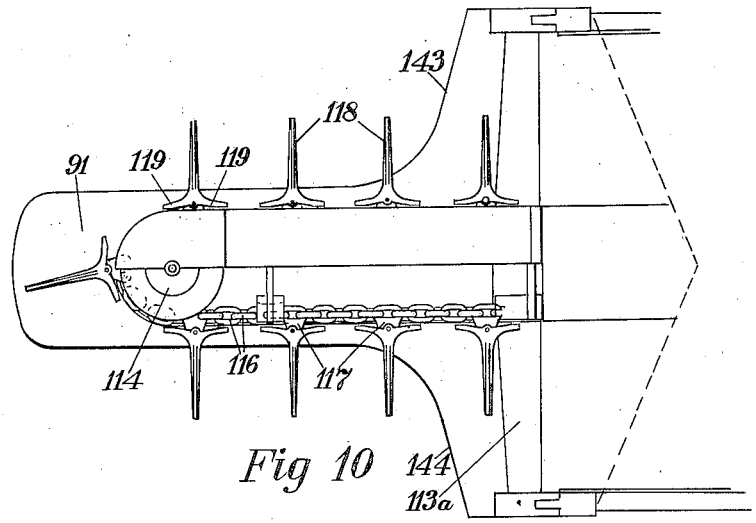
Figure 11:
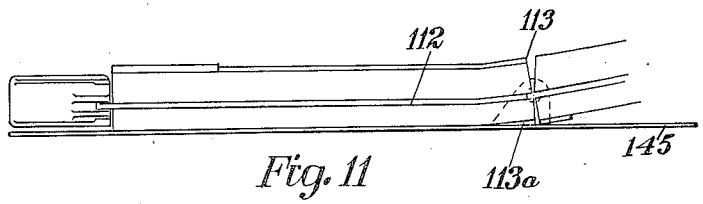
Figure 18:
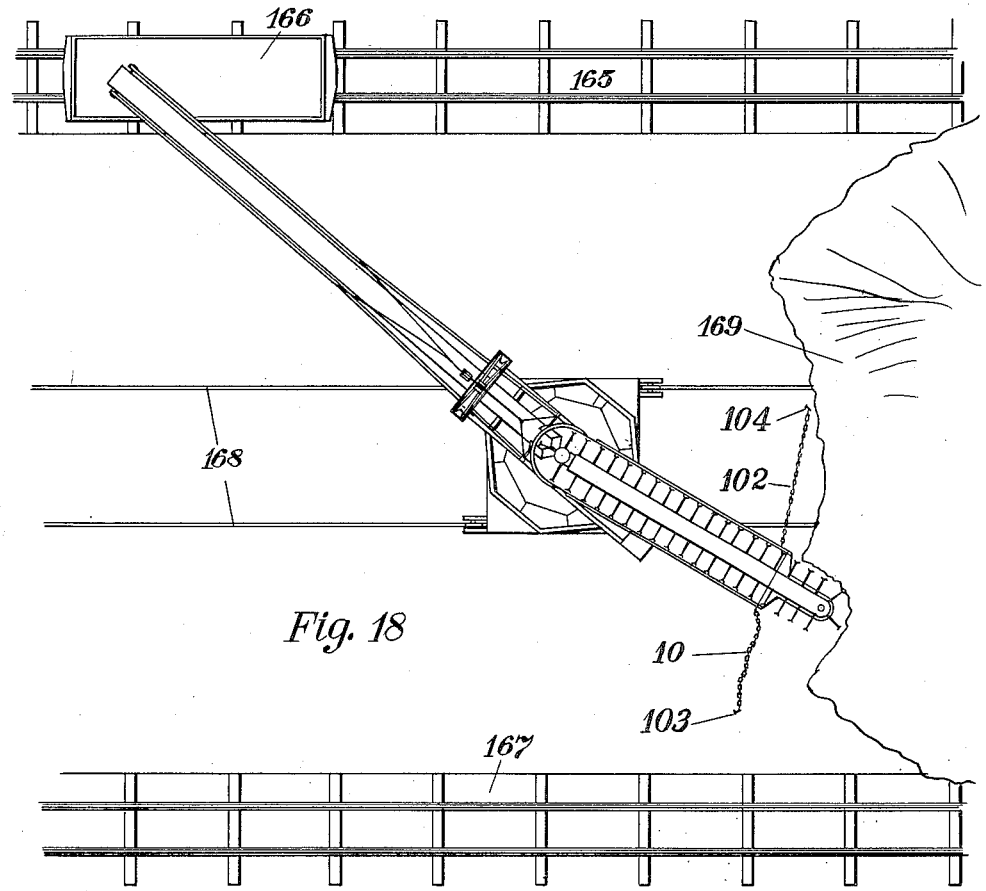
Figure 24:
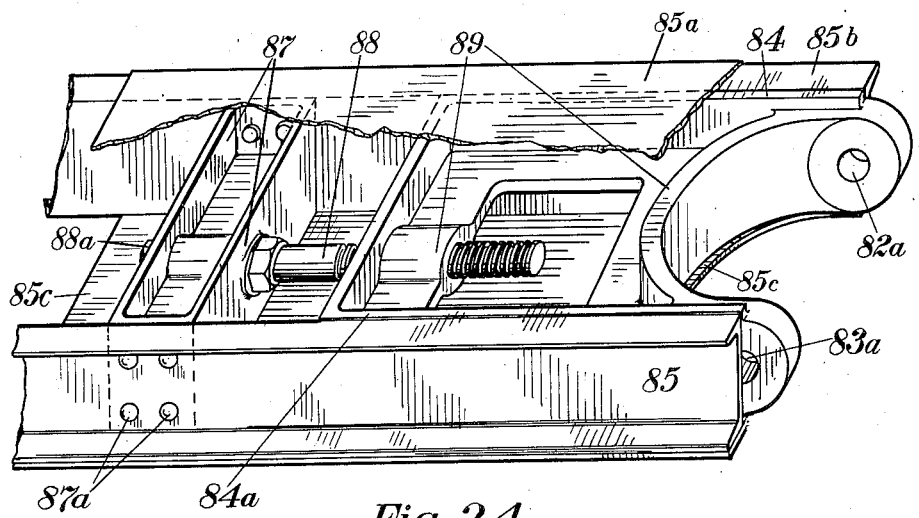
Figure 19:
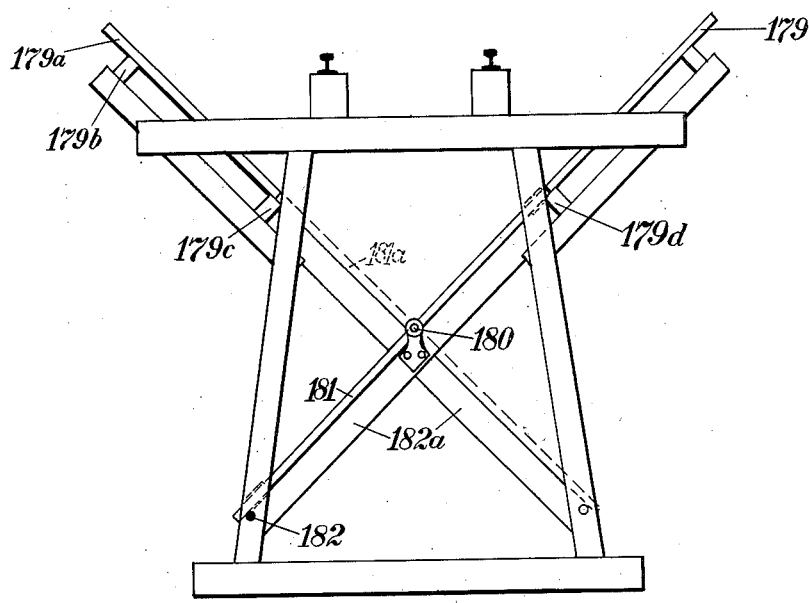

In the drawings, which are hereto attached and hereby made a part of this specification, Figure 1 is a side elevation of my improved machine; Fig. 2 is an upper plan view of the same; Fig. 3 is a side elevation of the turn table and platform thereon and the operating parts mounted thereon, the gathering conveyer and delivery conveyer being broken away; Fig. 4 is an upper plan view of the platform upon which the operating parts for the two conveyers are mounted; Fig. 5 is an upper plan view of the truck and actuating parts therefor; Fig. 6 is a side view of the gathering conveyer with parts broken away; Fig. 7 is a plan view of the construction shown in Fig. 6; Fig. 8 is a section through Fig. 6 along the line B—B; Fig. 9 is a section along the line A—A in Fig. 7; Fig. 10 is an upper plan view of the hinged nose portion; Fig. 11 is a side view of the construction shown in Fig. 10; Fig. 12 is a plan view of the construction at the upper end of the gathering conveyer, partly in section; Fig. 13 is a side elevation of the construction shown in Fig. 12, partly in section; Fig. 14 is a vertical section through the shaft shown in Figs. 12 and 13; Fig. 15 is a modified form of the flight and the position assumed by the same in rounding the sprocket; Fig. 16 is a side view of one of the flights shown in Fig. 15; Fig. 17 is a view partly in section showing the turntable; Fig. 18 is a plan view of a storage system showing my improved machine in the process of reclaiming the stored material; Fig. 19 is an end elevation of a trestle having an improved form of batter formed thereunder; Fig. 20 is an end view of a storage plan showing the trestle construction, the track for the loading machine, and a pile of material in storage; Fig. 21 represents a storage system in which the loading machine is engaged in gathering material from the batter and storing the same between the tracks; Fig. 22 illustrates a storage system in which the use of elevated tracks or trestles for cars is dispensed with; Fig. 23 illustrates a modified form of the system shown in Fig. 22; Fig. 24 is a perspective of the "take up" with parts broken away to show the mounting of the screw.

Referring to the drawings in which the same numeral designates the same part throughout, 1 denotes a truck upon which is mounted the turntable 2 upon which is mounted the platform 3; mounted upon the turntable is the upright tubular column 4 supported by the brace 5; adjacent to the upper end of column 4 is a collar 6, pivotally mounted upon which is the gathering conveyer 7, at the outer end of which is the hinged nose 8 mounted thereon to be moved vertically; said conveyer 7 carries means shown at 9 for moving the same laterally through the agency of the chain or cable construction shown at 10. The means for rotating the head shaft 11 is shown generally at 12, the head shaft operating to drive the conveyer chain traveling over gathering conveyer 7.

Mounted upon the platform 3 is a delivery conveyer 13 provided preferably with belt conveyer 14, which is driven through the drum 15, the latter being actuated by the construction shown generally at 16. Adjacent to one end of the platform 3 is mounted the frame 17, constructed to support the delivery conveyer 13 through the construction shown generally at 18, the raising and lowering of said delivery conveyer being effected through the mechanism illustrated at 19.

At 20 is shown a hopper construction between the gathering conveyer and delivery conveyer, constructed to guide the material on to the delivery conveyer, no matter at what position the same may be placed with respect to the gathering conveyer.

At 21 is shown a construction for weighting the end of the platform 3 opposite to that upon which the delivery conveyer is mounted.

The foregoing numerals refer to the general parts of the machine which have been mentioned at this point to give an idea of the manner in which the machine may operate, a detailed description of the construction of the various features being found hereinafter.

From the foregoing it will appear that the delivery conveyer 13 is adapted to be swung in a circle by means of the turntable, whereas the gathering conveyer, being mounted upon the turntable but not rotatable therewith, will not be affected by the positioning of the delivery conveyer; the lateral movement of the gathering conveyer is effected through the construction shown at 9, the movement thereof being independent of any movement of the delivery conveyer. The conveyers being thus adapted for movement independently of each other, provision is made by the adjustable hopper shown at 20 for directing the material brought by the gathering conveyer on to the delivery conveyer in any of the positions which the parts may assume.

Referring especially to Figs. 3 and 4, it is noted that the delivery conveyer 13 is pivotally mounted at 22 in the bracket 23, and is adapted to be swung vertically upon said pivot 22; the specific construction of the delivery conveyer need not be described, as it may be formed in any of the well known ways of constructing a truss. The frame 17, mounted upon the platform 3 at 24 is stayed by the rod 25 secured at its lower end to the platform and at its upper end to the upper end of said frame 17; the pulley construction shown at 18 carries the lever 26 mounted thereon at the pivot 27. Secured to one arm of the lever 26 is the cable 28 attached at its other end to the delivery conveyer at $28^a$, and secured to the other arm of lever 26 is the cable 29 attached at its other end to the delivery conveyer at $29^a$. The cables 28 and 29 each support approximately an equal portion of the load carried by the pulley construction at 18, and inasmuch as the stresses set up by the load in the cables 28 and 29 are unequal, the pivot point 27 is located between the center of the lever 26 and one end thereof at such point as to render the load supported by one arm approximately equal to the load supported by the other arm. The raising and lowering of the delivery conveyer is accomplished through the cable 30, passing over the pulley construction 18 and passing over the idler pulley 31 secured to the platform at 32, whence said cable 30 is carried to the drum 33, rotatably supported on the shaft 34, mounted at one end in the supports shown at 35. Shaft 34 carries at one end a gear wheel 36 in mesh with worm gear 37 actuated by the bevel wheel 38, the latter being adapted to enmesh with either of the bevel gears 39 and 40, the direction of rotation of bevel gear 38 being determined by the bevel gear by which it may be actuated. The provision of the bevel gears 39 and 40 makes it possible to reverse the direction of rotation of the shaft 34, and thereby to raise or lower the delivery conveyer at the will of the operator. These bevel gears are carried on shaft 41 which has rigidly mounted thereon the gear wheel 42 adapted to mesh with pinion 43 carried by the shaft of the motor 44. Conventional clutching devices are shown at 45 and 46 whereby either of the bevel gears 39, 40 may be thrown into actuating engagement with the gear wheel 38. Shaft 41 has its bearings in the platform 3 at points 47 and 48, said shaft carrying at its opposite end sprocket 49, over which passes the cable 50 to the sprocket wheel 51, the latter being mounted on shaft 52 adjacent to the end thereof. Shaft 52 has its bearings 53 and 54 in the platform 3, and carries rigidly thereon the drum 55. Preferably I provide a belt 56 for conveying material, said belt passing around the drum 55 and being actuated thereby through the construction just described; at its outer end conveyer 13 has pivotally and adjustably mounted therein the drum 57 over which the belt 56 passes. As stated, the conveyer may be raised or lowered as desired, and the belt is adapted to be operated by the construction described at any angle of elevation which the conveyer may have assumed.

The delivery conveyer is mounted upon the turntable 2, the construction and operation of which will now be described. The truck 1 may be formed, as shown in Fig. 5, preferably of the I-beams 59, having depending therefrom the framework indicated at 58; a rail 60 is provided upon which the wheels 61 are adapted to run, and above the wheels is positioned the inverted rail 62, the rails 60 and 62 forming the race for the turntable wheels, said wheels being conventionally shown in Fig. 1, and an end view of one wheel being shown in Fig. 17, to which further reference is hereby made. The framework 77, shown in Figs. 4 and 17, supports the internal annular rack 64 with which pinion 65 mounted upon vertical shaft 66 is adapted to mesh; shaft 66 carries at its lower end the worm wheel 67, adapted to enmesh with and to be driven by the worm gear 68 (see Fig. 5), said worm gear 68 being actuated through shaft 69 by gear wheel 70 meshing with pinion 71 carried at the outer end of the shaft of motor 72. The clutch 73 for engaging pinion 71 with the gear wheel 70 is controlled through the rod 74 and 74ª and the lever handle 75. In Fig. 17, a section through the annular rack and race is shown, the pinion 65 on shaft 66 supported in the bracket 76 being there shown in position in front of the section illustrated, it being understood that the rack is continuous and if the complete circle were shown, it would conceal the pinion from view. Upon reversing the motor 72, the direction of movement of the turntable will also be reversed, and the delivery conveyer 13 may thereby be rotated in either direction desired.

Referring to Fig. 5, frame members 63ª have positioned centrally thereon the plate member 63ᵇ, provided with an opening therethrough to receive the lower end of hub 123 (see Fig. 3), whereby the turntable is centered with respect to the race construction shown in Fig. 17. The platform or framework 3 upon which said delivery conveyer is mounted is itself supported upon the octagonal construction having the sides 77 and cross frame pieces 78 and 79, said side and cross frame pieces being secured together and braced by the plates 80. Mounted upon the frame 3 are the I-beams 81 supporting the tubular column 4 at its lower end, said column at its upper end being supported by the brace members 5; mounted in said tubular column 4 is a vertical head shaft 11; which is actuated in a manner hereinafter described. Surrounding said tubular column adjacent to its upper end and borne thereon is the collar 6 carrying the laterally projecting pins 82 and 83, (Fig. 14) which enter appropriate openings through the side frames, one side frame being shown at 84 supporting the upper end of the gathering conveyer. Said gathering conveyer is therefore supported at its upper end upon the collar 6, which may be given a rotary motion on the column 4, independent of the rotation of said column by said turntable and also independent of the rotation of the head shaft 11 therein. The manner of supporting the gathering conveyer at its upper end is shown in outline in Fig. 1 upon which is designated a frame supporting member 85, said frame supporting member being joined to the gathering conveyer on the underside thereof at 86.

Referring especially to Figs. 1, 12 and 24 a second frame supporting member is shown at 85ᵇ, a bottom cover for the take up is shown at 85ᶜ and a top cover at 85ª; slidably carried by the frame supporting member 85, 85ᵇ, is the frame 84, 84ª having the bracket 89, receiving the screw 88 which is mounted in the bracket 87 secured in the frame supporting members 85 and 85ᵇ by the bolts 87ª. At its forward end bracket 89 is of a yoke shape to embrace the collar 6, and to receive the pins 82 and 83 in the openings 82ª and 83ª. The head of the screw 88 is shown at 88ª. By turning the screw 88, the gathering conveyer may be moved towards or away from the head shaft as desired, thereby taking care of any slack that might be found in the conveyer chain, or loosening the latter whenever desired. This construction may be spoken of as the "take up", and is used for the purpose stated.

At its outer end the main gathering conveyer is provided with hinge pins, one shown at 90, to which is hinged a gathering or nose portion 91, to swing vertically. It will be noted that the hinge is in the horizontal plane of the oppositely disposed chain portions, whereby the chain is constantly kept adjusted to the varying positions of the nose portion 91; if the nose portion is inclined at an angle to the longitudinal line of the main gathering conveyer, the chain being disposed thereon in line with the hinge pins, will not be stretched or relaxed by the position which the nose portion may assume. This would not be true if the hinge were not in the same horizontal plane with the chain portions, and it is due to this construction that my nose portion 91 operates with entire success. Carried on said main gathering conveyer 7 is the actuating construction designated at 9, comprising the motor 92 having at the outer end of its shaft the pinion 93 adapted to mesh with gear 94, said gear actuating the worm 95, the latter meshing with the worm gear 96 mounted upon the shaft 97, said shaft carrying the sprocket 98; cable chain 99 passes around said sprocket and over guide roller 100, to sheave 101, one end of said cable 99 being led off in one direction indicated at 10, the other end being led in the opposite direction indicated at 102, and at its outer ends said cable 99 is secured to the anchor posts 103 and 104. As the cable is actuated by the motor the effect of the construction described will be to cause the gathering conveyer to be moved laterally in either direction at the will of the operator.

The construction of the gathering conveyer is clearly shown in Figs. 6, 7, 8, and 9, in which a truss construction is disclosed having the bottom frame members shown at 105, the top frame members 106, and the side frame members 107 and 108, said frame members being securely held together at their junctions by angle irons illustrated at 109. Longitudinally of this frame and resting upon the bottom members 105 is the angle iron or guide shown at 110, which has its beginning adjacent the sprocket wheel 115, and extends thence upon the conveyer frame and conforming in direction thereto, to the hinge 90 thereon; on the nose portion 91, is provided a continuation thereof indicated at 110$^a$, which is continued around the idler pulley 114 and along the opposite side of the face of said nose portion to the hinge 90. On the main gathering conveyer is provided a continuation 110$^b$ which is positioned upon the conveyer frame along the face thereof and terminates adjacent the sprocket wheel 115, opposite the end of guide 110, above noted. Positioned above the guides just described and spaced apart therefrom, and continuous therewith, is the angle iron or guide 111, 111$^a$, and 111$^b$; it is seen that this construction of the guides provides the continuous opening 112, the opening between the guides on the nose portion registering with and continuing the opening between the guides on the main conveyer. The adjacent ends of the guides at the hinge are cut away suitably at 113 to permit the vertical swinging of the nose portion on the axis of the hinge. At the outer end of the nose portion is mounted the idler pulley 114, and at the upper end of the head shaft 11 is mounted the sprocket wheel 115, the cable chain 116 passing around said sprocket and idler and being actuated by the sprocket through the head shaft 11. Said chain travels on the inner side of the angle irons or guides hereinbefore noted, said chain carrying at intervals thereon the members 117 to which the flights 118 are secured, said members 117 projecting outwardly through the opening 112 left between the oppositely disposed angle irons above noted, which act as guides for the chain and flights. These guides are continuous, as stated, and are constructed to conform to the contour of the conveyers, the main gathering conveyer being preferably curved adjacent its upper end as shown; the guides on the nose portion 91 are formed adjacent the hinge 90 with a slight upward curve therein, whereby the registration of the guides on the nose portion and main conveyer is effected.

Referring to Fig. 10, flights in their passage around the idler wheel 114 are shown, said flights each having an extension or tail piece 119 at each side thereof; these tail pieces are in engagement with the guides above noted, and said tail pieces hold the flights in operative position when the chain carrying said flights is moving in either direction. In my improved machine I contemplate the movement of the chain in either direction on the gathering conveyer as desired, and I render the flight capable of conveying material in either direction by the provision of the oppositely disposed tail pieces thereon, as shown. In Fig. 15 I have shown another form of flight at 120, said flight being secured to a member 121 provided in the form here shown at each of its ends with hooks 122; said member 121 is interposed between any two links of the chain, and is engaged therewith by means of the hooks 122; holes may be formed through member 121 to receive the links, if desired. The engagement of said member 121 with the drive sprocket 115 is shown in Fig. 15, the length of said member being determined by the construction of the sprocket wheel, and especially by the spacing of the teeth thereon. If properly adjusted to the sprocket used, said member may displace a plurality of links and thereby shorten the chain somewhat, and yet the said member will travel around the sprocket in such manner that the flight thereon is in the radial line of the sprocket, and is therefore always in working position. If a chain composed entirely of links were used and the flight 118 having the tail pieces 119 were secured to an enlargement of one of the links, in passing around the idler or sprocket wheel the flight would be thrown out of the radial line of said sprocket wheel, as shown in Fig. 10 either ahead of said line or behind the same, in either case the flight not occupying its best operating position. The flights provided with the tail pieces 119 are also somewhat open to objection for the reason that in rounding the idler the coal or loose material may enter the space between the guides and the outstanding tail pieces, rendering it therefore difficult for the flight to assume its normal position after the idler wheel or sprocket has been passed. The form of flight-attaching member shown in Fig. 15, obviates this difficulty, slightly shortens the chain, and maintains the flight in perfect operating position in its passage around the idler or sprocket wheel. As shown, said member 121 is detachable, and the flights may also be secured thereto detachably. Further, as seen, the form of flight-attaching member shown in Fig. 15 constantly maintains the flight in operating position, and also assures the proper engagement of the chain with the teeth of the sprocket wheel or idler.

The conveyer chain 116 at the upper end of the gathering conveyer passes around the sprocket wheel 115; this sprocket wheel is actuated in the following manner: Head shaft 11 is positioned in the tubular column 4, and at its lower end is rigidly fixed in the hub 123 of a horizontal bevel gear wheel 124; meshing with this gear wheel 124 is a bevel pinion 125 mounted at the end of a shaft 126 journaled in the frame 3 at 127 and 128. Said shaft carries the gear wheel 129 adapted to mesh with pinion 130 mounted on the shaft of the motor 131, said motor being mounted upon the frame 3 as shown. The operation of said motor therefore will cause the actuation of the head shaft 11 through the gearing construction described. The motor is constructed to reverse its operation, whereby the head shaft may be rotated in either direction, which of course will cause the conveyer chain and the flights to travel in either direction, as hereinbefore indicated.

The conveyer chain, as before pointed out, moves along on the inner faces of the guides, the flights engaging upon the outer faces of said guides, the form of flight shown at 118 engaging therewith by means of the tail pieces 119, and the form of flight shown at 120 engaging against the outer faces of the guides by means of the lugs 132. As seen, the links of the chain lying vertically are wholly on the inner side of the guides, while the links lying horizontally travel partly in the space 112 between the guides.

As appears by referring to the cross sections in Figs. 8 and 9, the gathering conveyer is provided with two slideways 133 and 134, having the sides 135 and 136; between these slideways is the construction shown at 137 arranged to cover the operating mechanism underneath the conveyer and protecting the same from the coal or other loose material being carried. As pointed out above, the two slideways are rendered necessary by the feature of my construction which permits the reversing of the travel of the chain, whereby material may be carried by the conveyer chain in either direction of its travel. The slideways are constructed to coöperate with the flights in the conveying of material, and are therefore formed continuously along the line of travel of the conveyer chain. At the inner end of the nose portion 91 adjacent the hinge 90, the chain guides are curved upwardly from the nose plate, and I therefore provide preferably a filler member 113$^a$ at that point, whereby the bottom of the slideway is rendered continuous and unbroken.

Adjacent the mounted end of the gathering conveyer, the floors of the slideways 133 and 134 are discontinued, and the sides 107 and 108 are likewise discontinued, but a curved extension 137$^a$ is provided, which practically acts as a continuation of the sides. A plate member 138 is mounted upon a collar 139 superposed upon the collar 6 and loosely surrounding the head shaft 11, and is rotatable with the turntable by means of the tie member 138$^a$; said plate member acts as a continuation of the floors of the slideways. Through this plate 138 is provided an opening at 140, in the rear of the column 4; I provide upon the lower face of said plate 138 at the opening 140 a hopper member 141, so that the material brought up the gathering conveyer by the flights 118, when the same is delivered to the opening 140, will be guided in its downward movement by means of the hopper 141. A second hopper member 142 is provided upon the delivery conveyer, and is preferably mounted pivotally as shown at 142$^a$ above the drum 55 actuating the belt conveyer 56, so that the material passing through the hopper member 141 will be guided on to the belt conveyer 56 through the second hopper member 142. The member 141 lies with its lower end loosely in 142, so that a certain degree of tilting motion in the member 142 due to the vertical movement of the delivery conveyer 13, may be accommodated and the member 142 will remain in register with the member 141. The hopper member 142 is preferably further secured by pivoted link 142$^b$ to the tubular column 4. The curved end member 137$^a$ is adapted to coöperate with the flights and the plate member described to deliver the loose material to the opening 140 into the hopper construction.

At the lower end of the gathering conveyer is the hinged nose piece or secondary conveyer 91; it will be noted that this hinged secondary conveyer or nose portion is cut away on both sides at 143 and 144, so that for some distance from this outer end the flights carried by the conveyer chain extend or reach beyond the nose portion into the material which is to be gathered and conveyed. The nose portion 91, on account of the hinge connection with the main gathering conveyer 7, may lie at an angle with the longitudinal line of said main gathering conveyer 7, and the construction is such that this angle may vary with the nature of the surface operated upon without decreasing the efficiency of the mechanism. The chain guides, as above stated, are positioned thereon in continuation of the guides on the conveyer frame 7, so that the conveyer chain with its flights is constantly maintained in operative relation with the slideways both on the conveyer frame 7 and the nose portion 91. For facilitating the movement both laterally and longitudinally of said nose portion, I provide the foot extension 145, which reaches rearwardly of the hinge, and acts as a rest and also as a foot member upon which the parts may readily slide laterally or longitudinally. This hinged construction renders it possible to gather material with facility; the nose portion is brought up close to the material to be operated upon, and as a plurality of flights project beyond the nose portion, they are in proper position to take into the material effectively, and all that is necessary is to feed the nose portion gradually into the side of the pile. This movement may be continued as long as the material can be reached by the nose portion in the lateral swing of the gathering conveyer. This construction of the nose portion combined with the means for reversing the travel of the conveyer chain, renders it possible to gather across the face of the pile in one direction, and to gather on the return across the face of the pile in the opposite direction. Therefore, I contemplate the movement of the nose portion back and forth across the face of the pile, the gathering being proceeded with continuously. With my improved hinged conveyer, I therefore render the gathering of the material more easy and expeditious, and gather over a wider area without moving the machine than has hitherto been possible.

I contemplate the provision of tracks as shown at 146, upon which my loading machine will be propelled backwardly and forwardly, or into or away from the material to be operated upon at the will of the operator; to this end I provide the construction shown most clearly in Fig. 5, in which the truck frame is shown at 1, mounted upon the wheels 147, there being carried upon the axle or shaft 148 a sprocket wheel or preferably a sheave 149; around the sheave 149 is adapted to operate a cable member 150, said cable being actuated as follows: On the framework of the truck having suitable bearings at 151, 152, and 153 is mounted the shaft 154 carrying thereon the gear wheel 155 adapted to mesh with pinion 156 borne on shaft 157; mounted on shaft 157 and adapted to actuate the same is gear wheel 158 meshing with pinion 159, on the shaft of the motor 72. Pinion 159 is adapted to be thrown into or out of mesh with the gear wheel 158 by the clutch mechanism 160, the latter being operated through the rods 161 and 74. Adjacent its ends said shaft 154 is provided with the sheaves 162 and 163, there being similar sheaves at the opposite end of said shaft. Cable 150 engages with sheaves 149 and 163, while cable 151ª engages with sheave 164 on the wheel shaft 148ª and also with the sheave 162 mounted at the end of the shaft 154.

Now if the motor be operated and the shaft 154 rotated clockwise, the cable 150 will set up a motion in the sheave 149 and consequently in the wheel 147 towards the right, while cable 151ª sets up a motion also towards the right in the wheel shaft upon which it is mounted, so that the motion of the truck under the assumed direction of rotation of the shaft 154 would be toward the right. If the motor be reversed the direction of movement of the truck will also be reversed.

My improved loading and storing machine readily adapts itself to systems of storing and reclaiming loose material, and in the drawings I have illustrated several systems.

Referring particularly to Figs. 18, 19, 20, and 21, 165 is a track having the car 166 thereon; 167 is a track preferably parallel with track 165, and between the two mentioned tracks is disposed a third track system 168, upon which I place the truck supporting my improved machine. In Fig. 18, the machine is shown engaged in gathering material from the pile 169 and delivering the same into the car 166, which may then be moved along the track 165 to any desired destination. In Fig. 21 I show my machine engaged in gathering material 170 from the foot of the trestle upon which track 167 is placed, and delivering the same to the space between the tracks 165 and 167, and arranging the same in a pile 171. Preferably the tracks are elevated as shown in Fig. 20, at 172 and 173, and underneath the tracks are provided the batters 174 and 175 upon which coal or other loose material unloaded from the cars is dropped to form the pile shown at 170. The elevated tracks with their continuous batters therefore form the side walls of the storage area, and the material may be piled to a great height between said tracks as shown at 176 in Fig. 20. The intermediate track upon which my improved machine is adapted to operate is preferably sunken as shown at 177 so as to bring the tops of the rails flush with the tops of the platform 178 between said elevated tracks, so that material may be stored upon said track 177 and readily gathered therefrom by my improved hinged gathering conveyer hereinbefore described. As stated, the machine is engaged in the work of reclaiming material in Fig. 18 and in storing it in Fig. 21. In Fig. 19 I show a batter formed of a stationary upper portion 179 on one side of the track and 179ª on the opposite side, said stationary portions being preferably secured upon the stringers 179ᵇ and 179ᶜ. Pivotally mounted upon the pin 180 to swing laterally thereon is the batter 181, positioned at its upper end upon the stringer 179ᵈ and at its lower end upon the removable pin 182, and when said pin is removed the batter 181 is free to swing on pivot 180 and assume the position shown in dotted lines 181ᵃ. The supporting truss for the trestle is shown generally in 182ᵃ. Therefore with this hinged batter construction I may dump coal either at one side or the other of the trestle, at will, and in either case have the same deflected as described by the batter, for the purpose of establishing storage at either or both sides of the track.

I have illustrated modified forms of storage systems in Figs. 22 and 23; in Fig. 22, 183 and 184 represent tracks along the sides of the storage area, and 185 is a belt conveyer adapted to carry material across said storage area. 186 represents a pile of loose material, 187 shows my improved machine in position for gathering material from the pile 186, and delivering the same on to the belt conveyer 185, whence it may be carried to either of the tracks 184 or 183. Underneath track 184, I have shown a bin 188, into which material from car 184 may be dumped, and elevated from the bottom of said bin by the conveying system 189, represented conventionally, and emptied into the bin or hopper 190, on to the belt conveyer 185. When the material is delivered in this manner a tripping device such as shown in Fig. 23 at 191, may be arranged over the belt for deflecting the coal therefrom on to the nose portion 91 of my improved machine, whence the material may be conveyed upwardly on to the delivery conveyer and from that point delivered wherever desired, the position of the parts of the machine being adapted to the conditions required. In Fig. 23, I have shown a similar arrangement of tracks, in which I dump the coal into the bin 193, and convey the same upwardly into the bin 194, whence by hopper arrangement shown conventionally at 195 the coal is delivered on to a belt shown in section at 196, and is carried thereon until reaching the tripper 191, by which it is discharged through either one or both of the chutes 197 and 198 onto the nose portion of my improved machine. Thence it is conveyed by one machine to the piles shown at 199 and by the other machine shown in Fig. 23 to the pile 200. The machine may be moved along the tracks as the pile advances, and the tripper may be moved along the conveyer belt 196 to any position desired in order to deflect the material from the belt on to the machine. In dotted lines in Fig. 23 I have shown the position of the delivery conveyer when the machine shown at 201 is used for gathering or reclaiming the material from the pile 200 and loading the same into the car shown at 202 for removal. In my improved loading and storage machine, therefore, it is seen that I provide gathering and delivery conveyers, mounted preferably upon a truck, whereby said machine may be moved with respect to the material to be operated upon, as desired. In using my machine a track for the truck is provided, and as it will generally be used in permanent storage yards, the track for the machine is located especially with respect to the tracks upon which the material is brought to the yard to be stored. A track at one side or at both sides or at one end of the yard may be provided, in the latter case a belt conveyer being arranged through the yard centrally from one end to the other, and by the use of appropriate tripping devices the material carried on this belt conveyer may be deflected at whatever points desired, where it may be picked up by the machine and stored; it being understood that the storing will progress in whatever manner the operator may desire.

To manipulate and position the delivery conveyer, I have described the turntable positioned upon the truck, and the means for actuating said turntable. By the use of the turntable the delivery conveyer may be swung through an angle of about two hundred and forty degrees in practice, thereby delivering the material over a wide area without moving the position of the machine proper. Mechanism is also provided and has been hereinbefore described for raising and lowering the delivery conveyer as desired, so that the same may be utilized for loading into cars near the surface line, or for delivering material to the top of a lofty pile. This provision for raising and lowering the delivery conveyer also obviates the breakage of the material operated upon, which would take place if the material were required to drop into storage from a fixed height.

The gathering conveyer hereinbefore described is mounted upon a loose collar on the central tubular column on the turntable, in such manner that said conveyer may be given a swing laterally in either direction. Means are provided, preferably carried by the gathering conveyer, for accomplishing this lateral movement, said means consisting essentially of a cable operated by a motor, the ends of the cable being positioned at a distance from the lower portion of the gathering conveyer and on both sides thereof, and secured to anchor means. The gathering conveyer is also capable of a vertical swing through a limited distance, being mounted upon the collar by a pivot construction.

At the outer end of the main gathering conveyer I provide a nose portion which is hinged to the gathering conveyer to swing vertically thereon; this nose portion is adapted to lie upon the ground or upon the platform upon which the material lies, and on account of the hinged construction, it may be positioned to conform to the surface, if required, at an angle with the longitudinal line of the main conveyer. The nose portion is cut away on its sides throughout the greater part of its length, and the flights on the conveyer chain therefore project beyond the base plate of the nose portion, and are therefore effectively brought into engagement with the material operated upon. The flights are so mounted that they do not only scrape material lying in their path, but also dig into the same with much force. The conveyer chain is adapted to travel in longitudinal guides mounted on the faces of the conveyer and nose portion, and conforming to the contour of said faces, and the flights are so constructed that they coöperate with the guides, and provision is made for reversing the travel of the chain and flights whereby material may be carried in either direction. To render it possible for the machine to gather material while the nose portion is moving in either lateral direction, I provide a slideway at each side of the gathering conveyer and the inner end of the nose portion; however, I may dispense with an outer side for the slideways on the nose portion, so that preferably the troughs in which the material is delivered will be constructed only on the main conveyer. At the hinge described, I provide an appropriate construction for giving the guides on the nose portion and on the main conveyer a slight upward curve, whereby the longitudinal openings between the guides register throughout the length of both conveyers. As described and shown, the construction at the hinge is such as to admit of the vertical swing of the nose portion, which I regard as a very essential feature of machines used for loading and storing or reclaiming purposes.

The slideways in the main conveyer are discontinued adjacent the upper end thereof, and I provide preferably a plate mounted on a collar, loosely surrounding the head shaft, the plate being mounted independently of the gathering conveyer, although ordinarily it would, through friction, be rotated by the gathering conveyer in its lateral swing. The plate is also mounted independently of the turntable, but is attached thereto as shown and therefore under ordinary conditions would assume a proper position at the ends of the slideways for receiving material brought up on the gathering conveyers. I provide an opening through the plate; and preferably at the upper end of the gathering conveyer, I provide the curved end member which coöperates with the plate and the guides and discharges the material through said opening. In order that material discharged through said opening may always pass properly on to the delivery conveyer, I have provided a hopper construction, formed preferably of two members, the upper member preferably extending loosely into the lower member and always registering therewith. The preferable construction is one in which the upper member is secured to the plate and is therefore movable therewith, the lower member being mounted upon the delivery conveyer frame and hence movable therewith. The lower hopper member is therefore subject to a movement upwardly and downwardly through a limited distance due to the upward and downward movement of the delivery conveyer, and of course as the delivery conveyer is carried in a lateral direction on the turn table, the hopper member attached thereto will move therewith. The upper member extending into the lower member, and being mounted upon the rotatable plate, the movement of the lower hopper member through a wide curve may cause the upper hopper member to be carried thereby, and it is therefore possible to form a satisfactory construction at this point without attaching said upper hopper member or plate to the turntable at any point, and this construction renders it certain that the two members will always register. It will be noted that I have also described a flight adapted to be secured to the chain to displace a plurality of links therein whereby the chain is somewhat shortened and also whereby the flight is constantly maintained in its most effective operating position both between the sprockets and when passing around the latter. I also have described a construction for supporting the delivery conveyer by which the stresses therein set up by the load of the conveyer are distributed equally to the supporting points thereon.

My machine being adapted especially for use in storing and reclaiming material, I have illustrated several systems of arrangement of storage plants.

I have illustrated in the drawings and described herein the construction which at the present time seems a preferable embodiment of my invention, but I do not limit myself to the construction shown and described, but desire the benefit of all variations of construction and modifications thereof which express the spirit of my invention.

What I claim is:

1. A loading machine comprising a platform mounted upon a truck, a turntable thereon, gathering mechanism pivotally mounted above said turntable, delivery mechanism supported on said turntable, means constantly in register with said delivery conveyer for discharging material from said gathering mechanism on to said delivery mechanism, and means for imparting lateral movement to said gathering mechanism.

2. A loading machine comprising a platform mounted upon a truck, a turntable thereon, radial gathering mechanism pivotally mounted above said turntable, delivery mechanism mounted upon said turntable independently of said gathering mechanism, means for vertically adjusting said delivery mechanism, means constantly in register with said delivery conveyer for discharging material thereon from said gathering mechanism, and means for actuating said truck towards and away from the material to be moved.

3. A loading machine comprising a platform mounted upon a truck, a turntable thereon, a tubular column supported within the above said turntable, a head shaft rotatably mounted in said column, a gathering conveyer mounted loosely upon said column, and a delivery conveyer mounted upon said turn table and adapted to swing thereon about the axis of said head shaft.

4. A loading machine comprising a platform mounted upon a truck, a turn table thereon, radial gathering mechanism supported on said turntable and constructed to be automatically adapted to varying elevations of the surface operated upon, means for discharging material from said gathering mechanism on to said delivery mechanism, said means being constructed to be constantly in register with the point of discharge from said gathering mechanism and the conveyer on said delivery mechanism.

5. In a loading machine, a column, a gathering conveyer pivotally mounted thereon, a plate loosely mounted on said column to receive the material borne by said conveyer and having a discharge opening therein, a delivery conveyer, and a hopper construction comprising a member depending from said plate and a second member mounted upon the delivery conveyer and registering with said depending member.

6. In a loading machine, pivotally mounted gathering mechanism, a turntable, delivery mechanism mounted upon said turntable to swing in a vertical plane, hopper means interposed between said gathering mechanism and said delivery mechanism and adapted to be constantly in position for discharging material on to said delivery conveyer regardless of the degree of inclination which the latter may have assumed.

7. In a loading machine, a turntable, a head shaft mounted thereon, a gathering conveyer supported to swing about the axis of said head shaft, a plate member mounted independently of said gathering conveyer to swing about the axis of said head shaft and constructed to receive material from said gathering mechanism and having an opening therein, a delivery conveyer mounted upon said turntable, and adapted to receive and carry away the material discharged through said opening in said plate.

8. In an inclined loading machine a gathering mechanism comprising a longitudinal frame, pivotally supported at its upper end and adapted to be supported at its other end upon the ground and constructed to be automatically adapted to varying elevations of the surface operated upon, a conveyer chain having flights adapted to travel over said frame, a longitudinal trough disposed upon each side of said frame in which said flights are adapted to travel, and means for actuating said conveyer chain to gather and deliver material through either trough at the will of the operator.

9. In a loading machine, a pivotally mounted gathering mechanism comprising a longitudinal frame, pivotally supported at its upper end and adapted to be supported at its its other end upon the ground and constructed to be automatically adapted to varying elevations of the surface operated upon, a conveyer chain having flights adapted to travel over said frame, a longitudinal trough disposed upon each side of said frame in which said flights are adapted to travel, means for reversing the direction of movement of said chain whereby material may be carried along either side of said conveyer, a delivery conveyer having its receiving end arranged beneath the delivery end of said gathering conveyer and adapted to receive and convey the material discharged thereon from said gathering mechanism.

10. In a loading machine, a truck, a turntable mounted thereon, gathering mechanism pivotally mounted on said turntable comprising an elongated frame having a longitudinal trough disposed upon each side thereof, a conveyer chain having lateral flights thereon adapted to travel in said troughs, means for reversing the direction of movement of said chain whereby material may be carried along either side of said conveyer, a delivery conveyer mounted upon said turn table and arranged to receive the material carried by said gathering conveyer, and separate actuating means for said conveyers.

11. In a loading machine, a truck, a turn table mounted thereon, gathering mechanism pivotally mounted at its upper end on said turn table comprising an elongated frame having a longitudinal trough disposed on each side thereof, a conveyer chain upon said gathering mechanism having lateral flights thereon adapted to travel in said troughs, means for reversing the direction of movement of said chain, whereby material may be carried along either side of said gathering mechanism, a delivery conveyer mounted upon said turn table and adapted to swing therewith and arranged to receive the material carried by said gathering mechanism, and actuating means for said conveyers.

12. In a loading machine, a conveyer frame, a plate hinged to the outer end thereof to swing about an axis at a right angle to the longitudinal line of said conveyer frame, a conveyer chain having lateral flights thereon and having its going and return portions adapted to travel over the upper surface of said conveyer frame and plate, a longitudinal trough disposed upon each side of said conveyer frame in which said flights are adapted to travel, means for operating said chain, and means for reversing the direction of movement of said chain whereby material may be gathered by said flights at either side of said plate, and carried along either side of said conveyer frame.

13. A conveyer frame mounted to swing laterally, a second conveyer frame hinged thereto and adapted to swing freely while in operation to adapt itself automatically to the contour of the surface operated upon about an axis at a right angle to the longitudinal line of said first conveyer frame, a conveyer chain adapted to travel over the surface of each of said conveyer frames, guides for said chain on each of said conveyer frames having a longitudinal direction parallel to the longitudinal direction of the respective conveyer frames, and means for operating said chain.

14. A conveyer frame mounted to swing laterally, a second conveyer frame hinged thereto and adapted to swing freely while in operation to adapt itself automatically to the contour of the surface operated upon about an axis at a right angle to the longitudinal line of said conveyer frame, a conveyer chain adapted to travel over the surface of each of said conveyer frames, guides for said chain mounted on each conveyer frame and conforming in direction to the longitudinal direction of the respective conveyer frames, and means for operating said chain.

15. A conveyer frame mounted to swing laterally, a plate hinged at the outer end thereof to swing freely while in operation to adapt itself automatically to the contour of the surface operated upon about an axis at a right angle to the longitudinal line of said conveyer frame, a conveyer chain mounted with its going and return portions upon said conveyer frame and plate, continuous guides for said chain upon said conveyer frame and plate, and means for actuating said chain.

16. A conveyer frame mounted to swing laterally, a plate hinged to the outer end thereof to swing freely while in operation to adapt itself automatically to the contour of the surface operated upon about an axis at a right angle to the longitudinal line of said conveyer frame, a conveyer chain mounted upon said conveyer frame and plate in such manner as to maintain oppositely disposed parts of the going and return portions of said chain in the same plane, and means for actuating said chain.

17. A conveyer mounted to swing laterally comprising two members secured together by hinges whereby each is adapted to swing freely while in operation to adapt itself automatically to the contour of the surface operated upon about an axis at a right angle to the longitudinal direction of the other, a conveyer chain mounted upon said conveyer and having oppositely disposed parts of its going and return portions in the same plane, means for maintaining said chain in operative relation with said conveyer throughout the length of both its members, and means for operating said chain.

18. A conveyer mounted to swing laterally comprising two parts secured together by hinges and each adapted to swing freely while in operation to adapt itself automatically to the contour of the surface operated upon about an axis at a right angle to the longitudinal direction of the other, a conveyer chain mounted with its going and return portions upon said conveyer, guides for said chain mounted upon said conveyer in a line conforming in direction to the operating surface of said conveyer, laterally projecting flights upon said chain, and means for operating said chain.

19. A conveyer mounted to swing laterally comprising two parts secured together by a hinge and each adapted to swing freely while in operation to adapt itself automatically to the contour of the surface operated upon about an axis at a right angle to the longitudinal direction of the other, a conveyer chain mounted with its going and return portions upon said conveyer, guides for said chain mounted upon said conveyer in a line conforming in direction to the operating surface of said conveyer, laterally projecting flights upon said chain, and means for operating said chain.

20. A conveyer mounted to swing laterally comprising two parts secured together by hinges and each adapted to swing freely while in operation to adapt itself automatically to the contour of the surface operated upon about an axis at a right angle to the longitudinal direction of the other, a conveyer chain mounted with its going and return portions upon said conveyer, guides for said chain mounted upon said conveyer in a line conforming in direction to the surface of said conveyer, laterally projecting flights upon said chain, means carried by said flights coöperating with said guides to maintain said flights in operative position, and means for operating said chain.

21. A pivotally mounted conveyer frame mounted to swing laterally, a second conveyer frame hinged thereto to swing freely while in operation to adapt itself automatically to the contour of the surface operated upon about an axis at a right angle to the longitudinal line of said first conveyer frame, a conveyer chain mounted to travel upon the surfaces of both of said conveyer frames, means for maintaining said chain in operative relation with the respective surfaces of said conveyer frames, means for operating said chain, and means for feeding said second conveyer frame into the material to be moved.

22. A pivotally mounted main conveyer frame mounted to swing laterally, an initial conveyer frame hinged thereto to swing freely while in operation to adapt itself automatically to the contour of the surface operated upon about an axis at a right angle to the longitudinal line of said main conveyer frame, a conveyer chain mounted to travel over the surface of each of said conveyer frames, means mounted upon each of said conveyer frames for maintaining said chain in operative relation therewith, laterally projecting flights on said chain, means for actuating said chain, and means for feeding said initial conveyer frame into the material to be moved.

23. A pivotally mounted main conveyer frame, an initial conveyer frame hinged thereto to swing about an axis at a right angle to the longitudinal line of said main conveyer frame, a conveyer chain mounted with its going and return portions upon the surface of each of said conveyer frames, guides for said chain mounted upon each of said conveyer frames and disposed in parallel relation with the longitudinal line of each of said conveyer frames, laterally projecting flights upon said chain, means for actuating said chain, said initial conveyer being constructed to permit the flights to gather material, and means for feeding said initial conveyer to the material to be moved.

24. A main conveyer frame, a drive sprocket mounted adjacent to one end thereof, a second conveyer frame hinged to said main conveyer frame to swing about an axis at a right angle to the longitudinal line of said main conveyer frame, an idler sprocket mounted adjacent to the outer end of said second conveyer frame, a conveyer chain adapted to be in engagement with said sprockets and mounted to travel upon the surfaces of both of said conveyer frames, continuous means mounted upon said conveyer frames between said sprockets for maintaining said chain in operative relation with the surface of each of said conveyer frames, and means for actuating said drive sprocket.

25. In a loading machine, an elongated conveyer frame pivotally mounted at one end thereof having a slideway along each side thereof, a conveyer chain, guides on said frames laterally extending flights on said chain, means in connection with said flights adapted to coöperate with said guides to maintain said flights in operative position with respect to said guides to convey material along either of said slideways, and means for reversing the direction of travel of said chain.

26. In a loading machine, an elongated conveyer frame having a slideway along each side thereof, a conveyer chain adapted to travel upon said frame, continuous guides upon said frame adjacent said slideways, lateral flights carried on said chain, means in connection with said flights adapted to coöperate with said guides to maintain said flights in operative position with respect to said guides to convey material along either of said slideways, and means for reversing the direction of said chain.

27. In a loading machine, a gathering sweep comprising a main conveyer, a second conveyer hinged thereto to swing about an axis at a right angle to the longitudinal line of said main conveyer and means carried by said sweep for feeding said second conveyer laterally in either direction into the material to be moved.

28. In a loading machine, a gathering sweep comprising a main conveyer, a second conveyer hinged thereto to swing about an axis at a right angle to the longitudinal line of said main conveyer, a flexible member engaging said sweep and having its ends secured at a distance therefrom, and a motor mounted on said sweep and adapted to operate said flexible member to feed said sweep laterally in either direction into the material to be moved.

29. In a loading machine, a gathering sweep comprising a main conveyer, a second conveyer hinged thereto to swing about an axis at a right angle to the longitudinal line of said main conveyer, a sprocket mounted on said sweep, a flexible member engaging said sprocket and having its ends anchored at a distance from said sweep on opposite sides thereof, and means for actuating said sprocket in either direction whereby said flexible member is operated to move said sweep laterally into the material to be conveyed away.

30. In a loading machine, a gathering sweep comprising a main conveyer, a second conveyer hinged thereto, a sprocket mounted on said sweep, a flexible traction member passing around said sprocket and engaging therewith and having its ends carried in opposite directions laterally away from said sweep, guides on said sweep for said traction member, anchor members to which the said ends are secured, and means carried by said sweep for actuating said sprocket whereby said second conveyer is fed laterally in either direction into the material to be moved, at the will of the operator.

31. In a loading machine, gathering mechanism comprising a pivotally mounted conveyer having a material trough at each side thereof, a second conveyer hinged to said pivotally mounted conveyer, a conveyer chain having laterally extending flights arranged to travel upon the surface of said conveyers, means for reversing the direction of travel of said chain, and means for feeding said gathering mechanism laterally in either direction into the material to be moved.

32. In a loading machine, gathering mechanism comprising a pivotally mounted conveyer having a material trough at each side thereof, a second conveyer hinged to said pivotally mounted conveyer, a conveyer chain having laterally extending flights arranged to travel upon the surface of said conveyers, means for reversing the direction of travel of said chain, means for feeding said gathering mechanism laterally in either direction into the material to be moved, and means for propelling said gathering mechanism towards or away from the material to be operated upon.

33. In a loading machine, a truck, a turn table thereon, gathering mechanism pivotally mounted upon said turn table, delivery mechanism pivotally mounted thereon to receive the material discharged by said gathering mechanism, a motor on said truck for actuating said turn table to position the discharge end of said delivery conveyer, means mounted on said truck for operating said truck forwardly and rearwardly with respect to the material to be moved, and means connected with said gathering mechanism to feed said gathering mechanism laterally into or out of the material to be operated upon.

34. In a loading machine, gathering mechanism comprising a conveyer, a chain arranged to operate on said conveyer and having laterally extending flights thereon, a sprocket wheel mounted at each end of said conveyer with which said chain is adapted to coöperate, members secured at intervals in said chain to form a portion thereof and displacing a plurality of links, to which said members said flights are attached, said members being adapted to maintain said conveyer chain constantly in operative position with respect to said sprocket wheel.

35. In a conveyer chain having laterally extending flights, a member to which said flights are adapted to be attached forming a portion of said chain and displacing therein a plurality of links, a sprocket wheel by which said chain is operated, said member in passing around said sprocket wheel being adapted to maintain said chain in operative relation with respect to said sprocket wheel, and guides for said chain, said member being adapted to maintain said flights in operative relation with respect to said guides.

36. In a conveyer chain having laterally extending flights, a member inserted in said chain to displace a plurality of links therein whereby said chain is shortened, a sprocket wheel adapted to engage with said chain to operate the same, said sprocket wheel being adapted to receive said member into operative relation with itself, whereby although said chain is shortened yet its operative relation with said sprocket is maintained.

37. In a loading machine a gathering conveyer, a delivery conveyer, a supporting frame for said delivery conveyer, a lever pivotally mounted at a point between its ends on said frame, cables secured at one of their ends to said lever adjacent its ends and at unequal distances from said pivot, said cables being secured at their other ends to said delivery conveyer at separated points thereon to support the same.

38. In a loading machine, gathering mechanism, a delivery conveyer, a supporting frame for the latter, a lever pivotally mounted at unequal distances from its ends on said supporting frame, members secured at one end to said lever adjacent the ends thereof and at the other end to said delivery conveyer at separated points thereon, whereby stresses due to the weight of said delivery conveyer are equalized throughout the length of said conveyer.

39. In a loading machine a delivery conveyer mounted to swing vertically, a supporting frame therefor, an equalizing member pivotally depending from said frame, and connections between said member and said conveyer whereby the latter is supported.

40. In a loading machine, a delivery conveyer, cables secured at one of their ends at separated points on said conveyer, a frame, a lever pivotally secured between its ends to said frame, said cables being attached at their other ends to the extremities of said lever, the position of said pivot being so located as to equalize the load carried by each arm, although the stresses set up in the cables are unequal.

41. In a loading machine, a gathering mechanism comprising a longitudinal frame pivotally mounted at one of its ends, a conveyer chain having laterally extending flights thereon adapted to travel over said frame, a longitudinal slideway for said flights disposed upon each side of said frame, sides for said slideways, a continuation of said sides forming an end wall for said conveyer frame, said slideway having a discharge opening through the bottom thereof adjacent said end wall, said continuation coöperating with said flights to cause the material carried to be discharged through said opening.

42. In a loading machine a gathering mechanism comprising a longitudinal frame pivotally mounted at one end, a conveyer chain having laterally extending flights thereon adapted to travel over said frame, a longitudinal slideway for said flights, a side wall for said slideway, a curved continuation of said side wall forming an end wall for said conveyer, said slideway having a discharge opening through its bottom adjacent said end wall, said end wall and flights coöperating to discharge the material carried by said conveyer through said opening.

43. In a loading machine, a gathering conveyer pivotally mounted at one of its ends, a slideway mounted upon said conveyer, a chain having laterally extending flights thereon, the latter being adapted to travel in said slideway, a plate pivotally mounted adjacent the pivotally mounted end of said gathering conveyer, said plate having an opening therein, exterior side walls for said slideway, a curved continuation of said side wall forming an end wall for said conveyer, said walls and said flights coöperating to discharge the material conveyed through said opening in said plate.

44. In a loading machine, a head shaft, a member loosely mounted upon said head shaft, a gathering conveyer mounted upon said member whereby said gathering conveyer may remain stationary when said shaft is rotated.

45. In a loading machine, a truck, a turn table mounted thereon, a head shaft mounted centrally on said turn table, a member loosely supported about said head shaft, and a gathering conveyer mounted upon said member, whereby said gathering conveyer remains stationary when said turn table is rotated.

46. In a loading machine, a truck, a turn table thereon, a head shaft rising centrally from said turn table, a collar loosely supported about said head shaft, a gathering conveyer mounted upon said collar whereby said conveyer remains stationary when said turn table is rotated, a chain having laterally extending flights thereon adapted to travel over the surface of said conveyer, and means for rotating said head shaft to operate said chain.

47. In a loading machine, a truck, a turn table mounted thereon, a head shaft mounted on said turn table, a supporting member mounted on said truck and loosely surrounding said head shaft, a gathering conveyer mounted upon said member to swing laterally thereon, a conveyer chain upon said conveyer, and means for rotating said head shaft to actuate said chain.

48. In a loading machine, a truck, a turn table thereon, a delivery conveyer mounted on said turn table, a head shaft mounted on said turntable, a member loosely surrounding said head shaft, a gathering conveyer supported on said member, a plate forming a continuation of the bottom of said conveyer loosely mounted on said head shaft adjacent said gathering conveyer and having an opening therein, and means for guiding the material discharged from said gathering conveyer through said opening on to said delivery conveyer.

49. In a machine having a gathering conveyer and delivery conveyer disposed to receive material therefrom, a hopper construction arranged between said conveyers for the purpose of delivering material from the gathering conveyer to the delivery conveyer, said hopper comprising a member mounted upon said delivery conveyer to move vertically therewith, a second member extending loosely into said first member and depending from a plate member, said plate member being rotatably mounted adjacent the delivery end of said gathering conveyer.

50. In a loading machine having a gathering conveyer pivotally mounted at one end, a plate adapted to rest upon the ground hinged to the other end of said gathering conveyer, a chain having flights thereon adapted to travel over said gathering conveyer and said plate, continuous guides for said chain on said conveyer and plate, said conveyer and plate being hinged in the plane of travel of the oppositely disposed portions of said chain, said plate projecting rearwardly beyond the line of junction with said conveyer.

51. In a loading machine having a gathering conveyer pivotally mounted at one end, a plate adapted to rest upon the ground hinged to the other end of said gathering conveyer, a chain having flights thereon adapted to travel over said gathering conveyer and said plate, continuous guides for said chain on said conveyer and plate, said conveyer and plate being hinged in the plane of travel of the oppositely disposed portions of said chain, a filler member adjacent the junction of said plate and conveyer over which said flights are adapted to operate whereby the surface of said plate is rendered continuous with that of said conveyer.

52. In a loading machine having a gathering conveyer pivotally mounted at one end, a plate adapted to rest upon the ground hinged to the other end of said gathering conveyer, a chain having flights thereon adapted to travel over said gathering conveyer and said plate, continuous guides for said chain on said conveyer and plate, said conveyer and plate being hinged in the plane of travel of the oppositely disposed portions of said chain, a filler member adjacent the junction of said plate and conveyer over which said flights are adapted to operate whereby the surface of said plate is rendered continuous with that of said conveyer, and a rearward extension on said plate beneath said filler member to adapt said plate to move readily over the surface operated upon.

53. A conveyer chain having a flight-bearing member forming a portion thereof and displacing therein a plurality of links, a sprocket wheel by which said chain is operated, such member in passing around said sprocket wheel being adapted to maintain said chain in operative relation with respect to said sprocket wheel, and guides for said chain, said flight bearing member being adapted to be maintained in operative relation with said guides.

In testimony whereof I affix my signature in the presence of two witnesses.

WILLIAM E. HAMILTON.

Witnesses:
CHARLES L. SHERWOOD,
WILLIAM D. HAMILTON.